United States Patent [19]

Sterzel

[11] Patent Number: 4,839,119
[45] Date of Patent: Jun. 13, 1989

[54] PREPARATION OF VERY STRONG PORE-FREE CERAMIC SILICON CARBIDE MOLDINGS STABLE AT HIGH TEMPERATURE

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 160,995

[22] Filed: Feb. 26, 1988

[30] Foreign Application Priority Data

Mar. 11, 1987 [DE] Fed. Rep. of Germany ....... 3707714

[51] Int. Cl.$^4$ .............................................. C04B 35/56
[52] U.S. Cl. ...................................... 264/66; 264/65; 264/332; 501/88
[58] Field of Search .......................... 264/66, 65, 332; 501/88

[56] References Cited

U.S. PATENT DOCUMENTS

| | | | |
|---|---|---|---|
| 4,372,902 | 2/1983 | Denton et al. | 264/65 |
| 4,571,331 | 2/1986 | Endou | 501/88 |
| 4,734,234 | 3/1988 | Sterzel | 264/66 |

FOREIGN PATENT DOCUMENTS

| | | |
|---|---|---|
| 0157586 | of 0000 | European Pat. Off. . |
| 0165554 | of 0000 | European Pat. Off. . |
| 0148277 | 7/1985 | European Pat. Off. . |
| 3603331 | of 0000 | Fed. Rep. of Germany . |
| 60-16869 | 1/1985 | Japan . |

OTHER PUBLICATIONS

Technische Akademie Esslingen, Weiderbildungs zentrum, Mar. 1985, Course 7578/67.017, H. Knoch, Herstellung und Eigenschaften verschiedener Siliciumcarbidwerk stoffe.
J. Am. Ceram. Soc. 69 (4), pp. 67–68.
Haggerty, John S.; Cannon, W. Roger; Laser–Induced Chem. Processes, 1981, 165–241; Ed. by Steinfeld, Jeffrey J.; Plenum, New York .
Better Ceramics Through Chemistry II, Materials Research Society, Symposia Proceedings, vol. 73, 1986, p. 369.

*Primary Examiner*—James Derrington
*Attorney, Agent, or Firm*—Keil & Wenkauf

[57] ABSTRACT

Compact pore-free silicon carbide moldings are produced by compressing amorphous silicon carbide powder in the absence of sintering assistants at from 1400° to 1800° C. and under from 100 to 2000 kp/cm$^2$ to give dense, glassy moldings. In a subsequent stage the resulting glassy moldings are converted into crystalline α-silicon carbide at from 1950° to 2200° C.

4 Claims, No Drawings

PREPARATION OF VERY STRONG PORE-FREE CERAMIC SILICON CARBIDE MOLDINGS STABLE AT HIGH TEMPERATURE

Non-oxide ceramic materials are based on compounds formed between the elements boron, carbon, nitrogen, silicon, titanium, zirconium, molybdenum and tungsten. These are the materials silicon carbide, silicon nitride, boron carbide, boron nitride and the boron silicides, in addition to the nitrides and carbides of titanium, zirconium, molybdenum and tungsten.

Silicon carbide has become particularly important because of its stability to oxidation and extremely high heat resistance. Silicon carbide is prepared by reduction of silica, which is available in sufficient quantity in nature, with carbon in an electric furnace.

It has been produced on a large industrial scale since the turn of the century and used for metallurgical purposes, for grinding and as a refractory material. It has been possible to make use of the special advantageous properties of silicon carbide in workpieces only since processes have been developed for processing the basic material to workpieces using only a small amount of foreign binders.

Various processes are known for the preparation of sintered silicon carbide products.

In the reaction sintering process (H. Knoch, Herstellung und Eigenschaften verschiedener Siliciumcarbidwerkstoffe, Technische Akademie Esslingen, Training Center, March 1985, Course 7578/67.017), green bodies of silicon carbide and carbon are infiltrated with silicon at above 1,400° C., the silicon reacting with the carbon present to form silicon carbide. In order to obtain compact moldings, an excess of silicon has to be used, so that products obtained by this process contain an excess of 6-15% by weight of free silicon, which is disadvantageous with regard to the properties. Moreover, only relatively thin-walled structural components can be produced from this product, since infiltration presents problems in the case of thicker walls.

Hot-pressed moldings of silicon carbide are obtained if silicon carbide doped with sintering additives, such as boron, aluminum and carbon, is subjected to uniaxial compression at about 2,000° C. (cf. J. Am. Ceram. Soc. 69 (4), C67-C68). The disadvantage of this process, which as such is expensive, is that only moldings of simple geometry can be produced. To produce more complicated moldings, these simple moldings must be worked by expensive grinding processes, which, owing to the great hardness of silicon carbide, can only be carried out using expensive diamond tools.

In hot isostatic pressing (Knoch, Loc cit), the molding is compacted on all sides at the sintering temperature under high pressure from an inert gas, acting from all sides. In this procedure, gas pressures of about 2,000 bar are maintained at about 2,000° C. Advantageously, hot pressing is combined with hot isostatic pressing by carrying out hot pressing until the external pores are closed and the molding can then be further sintered by the hot isostatic method.

Preferably, silicon carbide is sintered under atmospheris pressure. In this process too, the use of sintering assistants is essential, a wide variety of compounds being known for this purpose. According to German Laid-Open Application No. DOS 3,603,331, aluminum or refractory aluminum compounds and borides are used for this purpose (eg. $TiB_2$, $ZrB_2$ and $CrB_2$). According to U.S. Pat. No. 4,372,902, borides and carbon-containing compounds are also recommended, as they are in European Laid-Open Application Nos. 157,586 and 165,554.

Regardless of the sintering assistants added, the green compacts are sintered at from 1,900° to 2,300° C. under atmospheric or slightly superatmospheric pressure to give silicon carbide materials. Since in this case too any shaping method conventionally used in the ceramics industry can be employed for the preparation of the green compacts, there is an important advantage over the hot pressing process. However, one disadvantage is that this process is accompanied by sintering shrinkage, the linear shrinkage being about 18% (cf. Japanese Patent Application No. 83/120767).

The assistants required for sintering react with the surface of the silicon carbide particles, where they form a glass phase which is liquid under the sintering conditions. On cooling, this intergranular glass phase is retained and, because of its relatively low softening temperature, reduces the strength of the molding above this softening temperature, which is generally from 1,400° to 1,500° C. Moreover, the glass phase promotes the subcritical crack propagation under load and hence shortens the life of the molding.

In general, several processes are suitable for the preparation of the blanks or green compacts:

For numbers of articles in the middle range, the ceramic slip casting process is used. In this process, the starting powder is mixed with a liquid to give a slip, which is poured into a porous mould until the latter is full. The ceramic blank is formed by withdrawing the liquid from the mold. The ceramic mold can be produced relatively cheaply.

For large series, the automatic dry pressing process or the injection molding process is used. Both require expensive molds but have very short cycle times. For complex molds, as in the case of gas turbine components, injection molding is used. For this purpose, the mass is mixed with thermoplastics and/or waxes, heated in a suitable apparatus and forced into the mold, in which the plastic hardens. The process requires a further step, ie. elimination of the plastic by pyrolysis. This process makes the method substantially more difficult, especially in the case of products which must not contain any plastic. Pyrolysis is effected at increasing temperatures up to 1,000° C. and may last as long as several days, depending on the wall thicknesses.

An important problem in the production of ceramic components is encountered in relation to achieving uniformity within an article and from article to article. In these materials which are not plastically deformable, inhomogeneity immediately produces stresses which adversely affect the strength.

Because of the inhomogeneity and microcracks having dimensions of from 5 to 50 μm, it has been impossible to data to produce ceramic moldings which have a high load-bearing capacity and whose strength, particularly at high temperatures, is constant within limits admissible for construction. This is all the more important with regard to practical use, since there are as yet no reliable nondestructive test methods which conform to practical requirements and permit rejection of unsuitable moldings.

It is an object of the present invention to overcome the indicated disadvantages of the known processes for the economical production of reliable ceramic components of silicon carbide having high rigidity and strength at high temperatures during use.

It is an object of the present invention to provide a process for the production of compact, pore-free, microcrack-free moldings of silicon carbide which are free of shrinkage cavities. It is a further object of the present invention to provide a process which permits the moldings to be produced having the appropriate properties and in an economical manner.

It is a further object of the present invention to provide a process for the production of the above moldings which manages without strength-reducing, rigidity-reducing and heat stability-reducing additives.

We have found that these objects are achieved, according to the invention, if, in a first stage, amorphous silicon carbide powder is compressed in the absence of sintering assistants at from 1400° to 1800° C. and under from 100 to 200 kp/cm$^2$ to give a compact glassy molding and, in a second stage, the amorphous silicon carbide is converted to crystalline α-silicon carbide at from 1950° to 2200° C.

In the novel process, in the first stage, the starting material is compressed below a temperature at which rapid crystallization of the silicon carbide occurs, under superatmospheric pressure, to give a compact, porefree and glassy molding of the desired shape, and, in the second stage, the amorphous silicon carbide is converted to crystalline α-silicon carbide.

The invention is illustrated in detail below.

Finely divided, amorphous starting materials having particle sizes of from 0.001 to 0.2 μm are obtained according to the prior art by reacting $SiH_4$ and $CH_4/C_2H_4$ in the gas phase, a $CO_2$ laser serving as the energy source (cf. for example Haggerty, John S.; Cannon, W. Roger in "Laser-Induced Chem. Processes", 1981, 165–241; Ed. by Steinfeld, Jeffrey J.; Plenum, New York).

In another possible method for synthesizing amorphous silicon carbide, for example, $SiCl_4$ and $CCl_4$ are reacted with sodium in an inert solvent, such as n-heptane, at 130° C. (cf. Better Ceramics Through Chemistry II, Materials Research Society, Symposia Proceedings, Vol. 73, 1986, page 369). Typical particle sizes are 1–5 μm.

Amorphous silicon carbide, which preferably has a particle size of from 1 to 2 μm, is then compressed in a first stage at from 1400° to 1850° C. and under from 100 to 2000, preferably from 500 to 1000, kp/cm$^2$ to give a glassy molding. An important advantage of the novel process is that the silicon carbide is in a free-flowing state in this temperature range. Consequently, the pressure is transmitted uniformly to the molding material, even in remote parts of the mold. This effect which is absent during sintering of ceramic masses means that, in the novel process, moldings having a complicated shape can be produced economically and in large numbers by means of a plunger-type injection molding machine in production cycles which are limited only the flow of the molding material.

In carrying out the first process step, it is important that a very pure amorphous silicon carbide is used; in particular, the surface of the particles should be virtually free of silica. Hence, this step is carried out in a protective gas atmosphere, preferably argon.

This must be taken into account at as early a stage as the preparation of the powders, since, under the influence of oxygen and/or moisture, particularly finely divided SiC rapidly becomes coated with an $SiO_2$ layer, which would hinder subsequent compacting.

The optimum processing temperature and the time required for compacting are virtually inversely proportional to one another. Thus, the amorphous silicon carbide is converted to β-silicon carbide in the course of several hundred hours at 1450° C., in the course of 5 hours at 1750° C. and in the course of 1 hour at 1800° C. Conversion to β-silicon carbide should as far as possible be avoided.

Accordingly, the processing time may be long at low temperatures within the stated range, but must be short, ie. should not exceed 1 hour, at high temperatures. Since the processing time is short at high temperatures and at the same time the viscosity and hence the compressive pressure to be applied are low, temperatures of from 1700° to 1800° C. are preferred.

In a second, subsequent process step, the amorphous, glassy molding is converted to the actual ceramic molding by crystallization. In this process step, temperatures of from 1950° to 2200° C. are used. This treatment in the second stage can be carried out under any pressure but is preferably effected under atmospheric pressure; however, the shape should be restricted during the treatment in order to avoid distortion of the molding and hence a loss of dimensional accuracy. However, only small retaining forces are required for this purpose. Restriction of shape is essential because, during the heating phase and until a minimum crystallinity of from 5 to 20% is reached, the lower viscosity may result in the molding exhibiting flow, so that dimensional accuracy is no longer obtained.

The duration of the treatment in the second stage, in which the amorphous silicon carbide is converted to crystalline α-silicon carbide, is in general about 10–100 minutes. To increase the crystallization rate, it may be advantageous to add finely divided α-silicon carbide as a nucleating agent to the amorphous silicon carbide to be processed. The particle sizes of the nucleating agent are advantageously from 0.001 to 1 μm, and it is used in concentrations of from 0.0001 to 1% by weight, so that the number of nuclei are from $10^9$ to $10^{15}$ per cm$^3$ of silicon carbide.

Apart from the possibility of producing absolutely pore-free and microcrack-free moldings of SiC, the novel process has another important advantage:

If the crystallization of the molding is carried out using a local temperature gradient, it is possible to achieve directed crystallization which permits alignment of certain crystallographic axes in a desired preferred direction. Thus, it is possible for crystal faces known to have particularly high compressive or tensile strength in their direction to be located in the molding so that it is precisely these crystal faces which lie in the direction of maximum mechanical load on the molding to be produced.

Since the thermal expansion in most cases is anisotropic, ie. expansion differs markedly along the different crystallographic axes, it is advantageous, by means of directed crystallization, to align the crystal axes in such a way that thermal expansion is shifted to the desired directions in the molding.

The moldings produced according to the invention can be used as components having a high load-bearing capacity, in piston motors, gas turbines, heat exchangers or exhaust gas turbochargers or, for example, as substrates for integrated circuits.

EXAMPLE

An amorphous silicon carbide which was obtained by reacting silicon tetrachloride with carbon tetrachloride and sodium, had an oxygen content of <0.1% by weight and a mean particle size of 1.5 μm and contained, as a nucleating agent, 0.1% by weight of α-SiC having a particle size of about 0.5 μm was compressed at 1800° C. and under 1000 kp/cm² in the course of 15 minutes to give a glassy, pore-free molding measuring 3.5×4.5×60 mm. The compact was transferred to a mold preheated at 2000° C., where it was crystallized in the course of 10 minutes. This gave a pore-free molding which, according to X-ray measurement, consisted of 100% of crystalline α-SiC. By means of a four-point measurement, the flexural strengths were determined at a test speed of 0.5 mm/min at various temperatures. For this purpose, the test specimen was placed with its 4.5×60 mm surface centrally on top of two blades which were 40 mm apart. A ram which carries the two counter-blades 20 mm apart was moved toward the middle of this arrangement from above at the stated test speed.

| Temperature (°C.) | Measurement | Measured value (kp/cm²) |
| --- | --- | --- |
| 20 | Flexural strength | 9,000 |
| 1000 | Flexural strength | 9,000 |
| 1500 | Flexural strength | 8,500 |
| 20 | Modulus of elasticity | 4,800,000 |

I claim:

1. A process for the production of a compact, pore-free molding of silicon carbide by sintering silicon carbide powder at elevated temperatures, wherein, in a first stage, amorphous pure silicon carbide powder, the surfaces of which should be virtually free of silica, is compressed in a protective gas atmosphere in the absence of sintering assistants at from 1400° to 1800° C. and under from 100 to 2000 kp/cm² to give a compact glassy molding and, in a second stage, the amorphous silicon carbide is converted to crystalline α-silicon carbide at from 1950° to 2200° C.

2. A process as claimed in claim 1, wherein the amorphous silicon carbide powder has a particle size of from 1 to 2 μm.

3. A process as claimed in claim 1, wherein the amorphous silicon carbide powder contains, as a nucleating agent, crystalline α-silicon carbide in an amount of from 0.0001 to 1% by weight.

4. A process as claimed in claim 1, wherein the second stage is carried out under atmospheric pressure.

* * * * *